United States Patent Office 3,791,969
Patented Feb. 12, 1974

3,791,969
PROCESS FOR PREPARING VERMICULITE PERMSELECTIVE MEMBRANES
Arvind S. Patil, Silver Spring, Rip G. Rice, Ashton, and John W. Kraus, Glenwood, Md., assignors to W. R. Grace & Co., New York, N.Y.
No Drawing. Filed Mar. 22, 1972, Ser. No. 236,970
Int. Cl. B01d 13/00
U.S. Cl. 210—23                              6 Claims

ABSTRACT OF THE DISCLOSURE

A permselective membrane is prepared by providing an aqueous suspension of sodium exfoliated vermiculite, replacing at least part of the exchange sites with ions of a metal of Groups I-A and II-A of the Periodic Table, flocculating the resulting suspension, and dewatering the flocculated mass whereby the vermiculite platelets are aligned into a thin cohesive membrane. The membrane is useful in a variety of selective separation processes, such as water purification, and to process other solvents having soluble ionic contaminants. The membrane may be further modified to provide desiccating properties by incorporating various solid adsorbents, such as silica gel and activated carbon.

---

This invention relates to a process for preparing an inorganic permselective membrane composed of exfoliated vermiculite.

Organic permselective membranes are subject to a number of disadvantages which detract from their versatility of use. For example, organic membranes become fouled or plugged after relatively short periods of use in an electrodialysis cell. Being composed of organic materials, the membranes are also susceptible to bacterial attack in solution. Of further significance is that such membranes lack the ability to selectively transport specific ions and tend to collapse at temperatures approaching 250° F. and above. These disadvantages may be mitigated to some extent by resort to use of inorganic ion exchangers. However, such exchangers are almost exclusively used in particulate form since it has not been possible to form inorganic permselective membranes suitable for electrodialytic purposes.

It is an object of the present invention to provide a process for preparing economical inorganic permselective membranes which are effective in electrodialytic operations. This objective is achieved by providing an aqueous suspension of sodium exfoliated vermiculite, exchanging at least part of the sodium ions with ions of a light metal, flocculating the suspension of the modified vermiculite, and removing the water from the flocculated mass whereby the vermiculite flakes are arranged as a thin cohesive membrane. Such arrangement is obtained without the use of any external binder.

These membranes have a pore diameter up to about 5000 A. The pore size may be controlled to a certain degree by layering additional vermiculite to the initially-formed membrane and membranes thus prepared have a pore diameter ranging from about less than 100 to up to about 300 A. are permselective with respect to cations and remain so at least up to brackish water concentrations. Incorporation of anion exchange material is also possible to form anion permselective membranes where vermiculite platelets, which are deactivated to reduce their cation exchange properties or initially selected for low charge density, serve as a rigid matrix.

Sodium exfoliated vermiculite is prepared by contacting unexpanded vermiculite particles with a concentrated sodium salt solution and gently agitating the mixture for a time sufficient to allow penetration of the salt solution within the vermiculite flakes. The time may vary from about one hour to several days depending on the size of the particles and the batch of vermiculite being treated. The salt-treated vermiculite is then washed with deionized water until all salt which has not penetrated the particle structure has been removed. At this point, exfoliation is achieved. Further treatment with hydrogen peroxide followed by drying at 100° C. can be given to enhance exfoliation.

Sodium chloride is generally the salt which is used in treatment of the vermiculite particles principally because of its availability and low cost. It is employed in aqueous solution at a concentration ranging between 10 and 35%.

The sodium exfoliated vermiculite is suspended in water and cations of a light metal are added to the suspension in amount sufficient to exchange sites with at least part of the sodium ions. Suitable exchangeable cations are those metals of Groups I-A and II-A of the Periodic Table and are employed as water-soluble salts.

Salts of lithium are preferred because of the hydration properties of lithium ion. The purpose of partially exchanging the sodium ion is to reduce the requirement for lithium salt which is expensive. If desired, all sodium ions may be replaced for the purpose of converting the vermiculite to some other ionic form. Cation exchange is carried out by methods conventional in the art.

The suspension containing the ion exchange-modified vermiculite is then flocculated by the addition of suitable agents. These agents cause the vermiculite platelets to aggregate and assist in their alignment to form a cohesive membrane. Inorganic flocculating agents are preferred to avoid the disadvantages of the presence of organic materials in the membrane as discussed hereinbefore. Illustrative agents include mineral acids, such as hydrochloric acid; salts of mineral acids, such as $Ca(H_2PO_4)_2 \cdot H_2O$, $MgCl_2 \cdot 6H_2O$, aluminum sulfate, and ferric sulfate; and alkali metal hydroxides, such as potassium hydroxide.

The membrane is formed by quickly dewatering the suspension by appropriate means, such as filtration and centrifugation whereby the individual platelets are aligned and bonded to each other. If desired, dewatering may be carried out by depositing the flocculated suspension on a rigid porous support and applying overhead pressure or suction to the undersurface of the support. The undried or dried membrane may be used for reverse osmosis, and the dried membrane may be used for electrodialysis purposes.

The thickness of the resulting membrane ranges in general between about 5 and 100 mils. A higher transport number is obtained with these membranes. "Transport number" is defined as the fraction of the total current carried by a given ionic species during the passage of current. When a membrane allows selective passage of one type of ion over another, that is the transport number is greater than 0.5, it is conventionally known as a permselective membrane. The ideal cationic permselective membrane would have a transport number of 1 for the cation.

The porosity of the membrane of this invention can be controlled by incorporating additional flocculated material to a previously formed membrane. This serves to reduce the size of the pores by superimposing vermiculite platelets over existing pores in the membrane.

The addition of a small amount, on the order of about 10 to 50% by weight of the membrane, of a solid adsorbent endows the membrane with desiccating properties. Suitable adsorbents include silica gel, a molecular sieve and activated carbon. These additives are incorporated to the vermiculite suspension before it is flocculated. The improved desiccating properties are due to their combination with the capillary pores in the vermiculite matrix. The use of adsorbent in amounts of excess of about 20 to 25 percent tends to adversely affect the desiccating activity of the membrane. The thus-modified membrane can be used to remove water and organic liquids and it can be reused by thermal reactivation.

The charge density of the membrane may be increased by the addition thereto of up to about 50% by weight of a crystallize zeolite (molecular sieve). The "charge density" is defined as the number of charges per unit of effective surface area. These zeolites are aded to the vermiculite suspension before it is flocculated. Suitable synthetic crystalline zeolites are shown in the following table:

culated. Representative exchange materials which may be used include the following:

TABLE II

| Cation exchange | | Anion exchange | |
|---|---|---|---|
| Additive | Exchange capacity (meq./g.) | Additive | Exchange capacity (meq./g.) |
| Zeolites, e.g. chabazite, cancrinite. | 3–10. | Apatite | 1. |
| Zirconium phosphate | 4 (pH 7). | Mercarbide | 1.5. |
| Titanium phosphate | 3 (pH 7). | Magnetite | 2 (pH 5). |
| Various sulfonic acid resins | >3. | Basic lead sulfate | 2 (pH 6). |
| Potassium polyphosphate | 8.5. | | |
| Sodium trititanate | 7. | | |

TABLE I

| Zeolite | Oxide mole ratios (shown as alkali metal oxide form) | Patent disclosure |
|---|---|---|
| X | $1.0\pm0.2Na_2O:Al_2O_3:5\pm0.5SiO_2:0-8H_2O$ | U.S. 2,882,244 |
| Y | $0.9\pm0.2Na_2O:Al_2O_3:3-6SiO_2:0.9H_2O$ | U.S. 3,130,007 |
| A | $1.0\pm0.2Na_2O:Al_2O_3:1.85\pm0.5SiO_2:0-6H_2O$ | U.S. 2,882,243 |
| L | $1.0\pm0.1Na_2O:Al_2O_3:6.4\pm0.5SiO_2:0-7H_2O$ | Belgium 575,117 |
| D | $0.9\pm0.2[(0-1)Na_2O:(1-0)K_2O]:Al_2O_3:4.5-4.5\ 49SiO_2:0-7H_2O$ | Canada 611,981 |
| R | $0.9\pm0.2Na_2O:Al_2O_3:2.45-3.65SiO_2:0-7H_2O$ | U.S. 3,030,181 |
| S | $0.9\pm0.2Na_2O:Al_2O_3:4.6-5.9SiO_2:0-7H_2O$ | U.S. 30,054,657 |
| T | $1.1\pm0.4[(0\ 1-0.8)Na_2O:(0.9-0\ 2)K_2O]:Al_2O_3:6.9\pm0.5SiO_2:0-8H_2O$ | U.S. 2,950,952 |
| Z | $K_2O:Al_2O_3:2SiO_2:0-3H_2O$ | Canada 614,995 |
| E | $0.9\pm0.1Na_2O:Al_2O_3:1.95\pm0.1SiO_2:0-4H_2O$ | Canada 636 931 |
| F | $0.95\pm0.15Na_2O:Al_2O_3:2.05\pm0.3SiO_2:0-3H_2O$ | U.S. 2,996,358 |
| O | $0.95\pm0.05Na_2O:Al_2O_3:12.2\pm0.05SiO_2:0-5H_2O$ | U.S. 3,140,252 |
| B | $1.0\pm0.2Na_2O:Al_2O_3:3.5\pm1.5SiO_2:0-6H_2O$ | U.S. 3,008,803 |
| Q | $0.95\pm0.05Na_2O:Al_2O_3:2.2\pm0.05SiO_2:XH_2O$ | U.S. 2,991,151 |
| M | $1.0\pm0.1K_2O:Al_2O_3:20\pm0.1SiO_2XH_2O$ | U.S. 2,995,423 |
| H | $1.0\pm0.1Na_2O:Al_2O_3:2.0\pm0.1SiO_2XH_2O$ | U.S. 3,010,789 |
| J | $0.9\pm0.1K_2O:Al_2O_3:2.1\pm0.2SiO_2O$ | U.S. 3,011,869 |
| W | $1.0\pm0.1Na_2O:Al_2O_3:4.1\pm0.8SiO_2:YH_2O$ | U.S. 3,012,853 |
| KG | $0.9-1.1Na_2O:Al_2O_3:2.3-4.2SiO_2:2.6-4.6H_2O$ | U.S. 3,056,654 |

Among the naturally-occurring crystalline aluminosilicates which can be employed are levynite, dachiardite, erionite, faujasite, analcite, paulingite, noselite, ferriorite, heulandite, scolecite, stibite, clinoptilote, harmotome, phillipsite, brewsterite, flakite, datolite, and aluminosilicates represented as follows:

Chabazite, $Na_2O.Al_2O_3.4SiO_2.6H_2O$
Gmelinite, $Na_2O.Al_2O_3.4SiO_2.6H_2O$
Cancrinite, $3(Na_2O.Al_2O_3.2SiO_x)Na_2O_3$
Leucite, $K_2O.Al_2O_3.4SiO_2$
Lazurite, $(Na, Ca)_2Al_6Si_6O_{24}.2(S, Cl, SO_4)$
Scaplite, $Na_4Al_3Si_9O_{24}.Cl$
Mesolite, $Na_2O.Al_2O_3.3SiO_2.2-3H_2O$
Ptilolite, $Na_2O.Al_2O_3.10SiO_2.4H_2O$
Mordenite, $Na_2O.Al_2O_3.10SiO_2.6.6H_2O$
Nepheline, $Na_2O.Al_2O_3.2SiO_2$
Natrolite, $Na_2O.Al_2O_3.3SiO_22H_2O$
Sodalite, $3(Na_2O.Al_2O_3.2SiO_2).2NaCl$ The preferred crystalline zeolites are the "synthetic faujasites." "Synthetic faujasites" are defined as including zeolite X and zeolite Y, examples of which are disclosed in the U.S. Pats. Nos. 2,882,244 and 3,130,007, respectively, since both of these compositions exhibit the crystal structure of natural faujasite.

The modified sodium exfoliated vermiculite membranes of this invention are normally cation selective and may be further modified with respect to different cations as well as anion selectivity. The cation and anion exchange materials are added to the suspension before it is floc- The invention is further illustrated by the following examples.

EXAMPLE 1

An aqueous suspension of sodium exfoliated vermiculite was steeped for 24 hours in a 20% aqueous solution of lithium chloride. Approximately 50% of the sodium was replaced by the lithium. The thus-modified vermiculite was flocculated by the addition of approximately 1–5 ml. of dilute (20%) hydrochloric acid and the flocculated mass was centrifuged to rapidly remove the water. The individual vermiculite platelets were aligned into a continuous thin film having a thickness of about 20 mils and a pore diameter below 1000 A.

EXAMPLE 2

The process of Example 1 was repeated except that finely divided silica gel in an amount up to about 50% by weight of the finished membrane was added to the suspension before it was flocculated.

EXAMPLE 3

The process of Example 1 was repeated except that about 20% by weight of the crystalline zeolite (identified as type 4A by the Linde Division of Union Carbide Corporation) was added to the suspension before it was flocculated.

EXAMPLE 4

The process of Example 1 was repeated except that 10% by weight of zirconium oxide was added to the suspension before it was flocculated.

EXAMPLE 5

The process of Example 1 was repeated except that 20% by weight of anion exchange material Mercarbide (a mercury carbon) was added to the suspension before it was flocculated.

EXAMPLE 6

The process of Example 1 was followed wherein flocculated material was added to the finished membrane. The thus-modified membrane had a thickness of 20 mils and a pore diameter ranging between about 100 and 1000 A.

EXAMPLE 7

The permselectivity of the membrane prepared according to Example 1 was tested by wetting the membrane with a NaCl solution and placed in a cell arranged as follows:

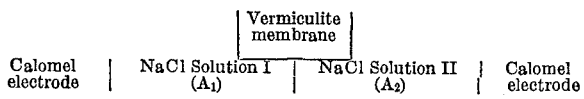

| Calomel electrode | NaCl Solution I ($A_1$) | NaCl Solution II ($A_2$) | Calomel electrode |

By varying the concentrations (activities) of the NaCl solution on either side of the membrane while maintaining a constant $A_1:A_2$ ratio, the transport number for sodium ion was determined from electromotive measurements. These are reported below:

| Molal activities | | Molal concentration | | E.m.f. (mv.) | Transport number for $Na^+$ |
|---|---|---|---|---|---|
| $A_1$ | $A_2$ | NaCl I | NaCl II | | |
| 0.00557 | 0.00186 | 0.00605 | 0.00195 | 27.9 | 0.99 |
| 0.05 | 0.0167 | 0.062 | 0.0192 | 26.0 | 0.92 |
| 0.15 | 0.05 | 0.205 | 0.062 | 23.2 | 0.82 |
| 0.45 | 0.15 | 0.673 | 0.205 | 16.3 | 0.58 |

It can be shown that potential developed in the cell is described by:

$$\Delta E = 59.15 ti \log \frac{a_1}{a_2} \text{ (mv.)}$$

since the ratio of $a_1/a_2$ is 3 in this case if the membrane is ideally and permselective, i.e. $ti=1$, then the potential developed is the maximum one and this $\Delta E_{max}$ would be 28.15 mv. For the case where the membrane is less than ideal i.e. $ti<1$, the potential will be less than $\Delta E_{max}$. It can be easily shown that for the above cell for constant ratio of solution activities on either side of the membrane $$\frac{\Delta E}{\Delta E_{max.}} = ti$$

As an approximation, the transport number determined can be considered to be representative of the average concentration of solution i.e.

$$\frac{a_1 + a_2}{2}$$

As the solution concentration increases the transport number of most of the membranes decrease due to leakage of other than the main ion. The table shows that vermiculite membranes are permselective ($ti>0.5$) in the region of brackish water.

EXAMPLE 8

A lithium-saturated vermiculite suspension was slightly flocculated with hydrochloric acid and then laid on a porous stainless steel support having pores of about 5 microns and under a pressure of about 50 p.s.i. Flow rates of up to 5 cm./hour under gauge pressure of feed solution of up to about 50 atmospheres was obtained. The feed solution contained sodium chloride, sodium nitrate, sodium phosphate and sodium stearate. The rejection of these effluents ranged from 20 to 90% which indicates that the dynamically-formed membranes are suitable for treatment of saline and brackish water.

The vermiculite membranes prepared according to this invention are composed entirely of inorganic materials and are inert in the environments in which they are employed. A distinct advantage of using the inorganic ion exchange membranes in their high temperature dimensional and chemical stability. This allows membrane processes, such as electrodialysis and electrodecantation, to be carried out at temperatures ranging between about 60 and 80° C. where the electrical resistance of the system can be substantially reduced to improve the economies of the process.

We claim:

1. A process for preparing a permselective membrane which comprises providing an aqueous suspension of sodium exfoliated vermiculite, replacing at least part of the exchange sites with ions of a metal selected from the group consisting of lithium and II-A of the Periodic Table, flocculating the resulting suspension with mineral acids, salts of mineral acids, or alkali metal hydroxides, and forming the flocculated mass into a thin cohesive membrane.

2. A process according to claim 1 wherein a solid adsorbent material is added to the suspension before it is flocculated.

3. A process according to claim 1 wherein a crystalline zeolite is added to the suspension before it is flocculated.

4. A process according to claim 1 wherein a cation exchange material is added to the suspension before it is flocculated.

5. A process according to claim 1 wherein an anion exchange material is added to the suspension before it is flocculated.

6. A process according to claim 1 wherein additional flocculated material is added to the formed membrane.

References Cited

UNITED STATES PATENTS

| 3,331,772 | 7/1967 | Brownscombe et al. | 210—500 X |
| 3,462,362 | 8/1969 | Kollsman | 210—23 |
| 3,344,928 | 10/1967 | Kraus et al. | 210—500 |

FRANK A. SPEAR, JR., Primary Examiner

U.S. Cl. X.R.

210—321, 500